(12) United States Patent
Colless et al.

(10) Patent No.: US 8,407,935 B1
(45) Date of Patent: Apr. 2, 2013

(54) FODDER GROWING SYSTEM AND METHOD

(76) Inventors: Terry Colless, Toowoomba South (AU); Flavio Raccanello, Toowoomba South (AU)

( * ) Notice: Subject to any disclaimer, the term of this patent is extended or adjusted under 35 U.S.C. 154(b) by 0 days.

(21) Appl. No.: 13/398,772

(22) Filed: Feb. 16, 2012

(51) Int. Cl.
*A01G 31/00* (2006.01)
*A01G 9/02* (2006.01)

(52) U.S. Cl. .......................... 47/66.6; 47/60

(58) Field of Classification Search .......... 47/60, 61, 47/65.5, 65.9, 66.1, 66.6, 79
See application file for complete search history.

(56) References Cited

U.S. PATENT DOCUMENTS

| | | | |
|---|---|---|---|
| 4,322,443 A | 3/1982 | Frontczak | |
| 4,462,184 A | 7/1984 | Cunningham | |
| 4,716,679 A | 1/1988 | Heard | |
| 5,073,401 A | 12/1991 | Mohr | |
| 5,345,713 A | 9/1994 | Molnar et al. | |
| 6,058,650 A | 5/2000 | Chen | |
| 6,357,176 B2 | 3/2002 | Baldwin et al. | |
| 7,650,715 B2 | 1/2010 | Fujita | |
| 2009/0235583 A1 | 9/2009 | Colless et al. | |

*Primary Examiner* — Monica Williams
(74) *Attorney, Agent, or Firm* — QuickPatents; Kevin Prince

(57) ABSTRACT

The present device is a structure for growing plants on a ground surface. The structure includes an elongated concrete slab having a raised curb on each side. A roof is fixed with the upper edge of each curb. A front end panel and a rear end panel are fixed between the roof, the curbs and the slab creating an interior space. An irrigation system and lamps extend along the length of the slab to irrigate and illuminate a top surface of the slab. At least one heating pipe is within each slab to heat the slab and the plants within the structure. Plant seeds may be scattered on the top surface of the slab and are irrigated based on a timed schedule by the irrigation system and illuminated by the lamps to grow the plants. The end panels are removed for harvesting the plants once the plants have grown.

11 Claims, 4 Drawing Sheets

FODDER GROWING SYSTEM AND METHOD

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to fodder growing, and more particularly to a building and method for rapidly and inexpensively growing fodder.

DISCUSSION OF RELATED ART

Providing adequate feed to livestock is a significant challenge for those that raise livestock for a living. A variety of options exist depending on the environment where livestock are raised. In conditions where the land is plentiful and growing conditions are ideal, livestock are typically allowed to graze on the plants and grass that grow on the property. However, in many parts of the world, land is plentiful but growing conditions are poor. Often the temperatures of the location are too extreme to grow fodder dependably throughout the year. In such situations, farmers need to buy feed from outside sources, which is generally more expensive than growing the feed themselves. Therefore, there is a need for a device that allows farmers to grow fodder for livestock in conditions where the climate is not favorable for growing fodder.

A variety of fodder growing systems have been developed to provide farmers the ability to grow fodder in a variety of conditions. However, despite the development of many approaches to fodder growing, these approaches often have significant drawbacks. Typically, such fodder growing systems are highly complicated in the structure and mechanisms used to grow the fodder. Such complicated systems are very expensive and are only affordable to farmers growing a large number of livestock. Therefore, a fodder growing device is needed that is relatively economical in structure yet still highly effective at growing fodder.

Furthermore, the harsh temperatures and conditions that necessitate a fodder growing solution also act as an obstacle to creating a more economical fodder growing structure. Therefore, a device is needed that is economical in the effectiveness of growing fodder and has the durability to withstand a variety of harsh temperatures and conditions of the location it is used.

Therefore, there is a need for a device that allows farmers to grow fodder for livestock in conditions where the climate is not favorable for fodder. Also, a fodder growing device is needed that is relatively economical in structure yet still highly effective at growing fodder. Further, a device is needed that is economical in the effectiveness of growing fodder and has the durability to withstand a variety of harsh temperatures and conditions of the location it is used. The present invention accomplishes these objectives.

SUMMARY OF THE INVENTION

The present device is a structure for growing plants, such as fodder, on a ground surface. The structure includes an elongated concrete slab having a pair of sides, a front side, a back side, a bottom surface, and a top surface. Each side has a raised curb having an upper edge. A roof is fixed with the upper edge of each curb and including a bottom surface and a top surface. A front end panel and a rear end panel are each selectively fixed between the roof, the curbs and the slab. An interior space is defined within the structure between the slab, roof, end panels and curbs.

An irrigation system extends along the length of the slab and includes a controller. The irrigation system is adapted to irrigate the top surface of the slab based on a timed schedule of the controller. A plurality of lamps extend along the length of the slab and are fixed with the bottom surface of the roof. At least one heating pipe is within each slab such that a heat exchange fluid may be circulated through each heating pipe to heat the slab and the plants within the structure.

Plant seeds may be scattered on the top surface of the slab. The roof is then affixed to the upper edges of the curbs, the end panels fixed with the roof, curbs and slab. The seeds are irrigated based on the timed schedule by the irrigation system and illuminated by the plurality of lamps to grow the plants. The end panels are removed for harvesting the plants once the plants have grown.

The bottom surface of each slab includes recessed portions proximate each side thereof for receiving the upper edge of the raised curbs of another slab. A plurality of the slabs may then be vertically stacked with the roof fixed to a top slab. The irrigation system and lamps extend along the length of each slab, illuminating and irrigating the top surface of each slab.

The present invention is a structure that allows farmers to grow fodder for livestock in conditions where the climate is not favorable for growing fodder. The fodder growing structure is relatively economical yet still highly effective at growing fodder. Further, the structure is economical in the effectiveness of growing fodder and has the durability to withstand a variety of harsh temperatures and conditions of the location it is used. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
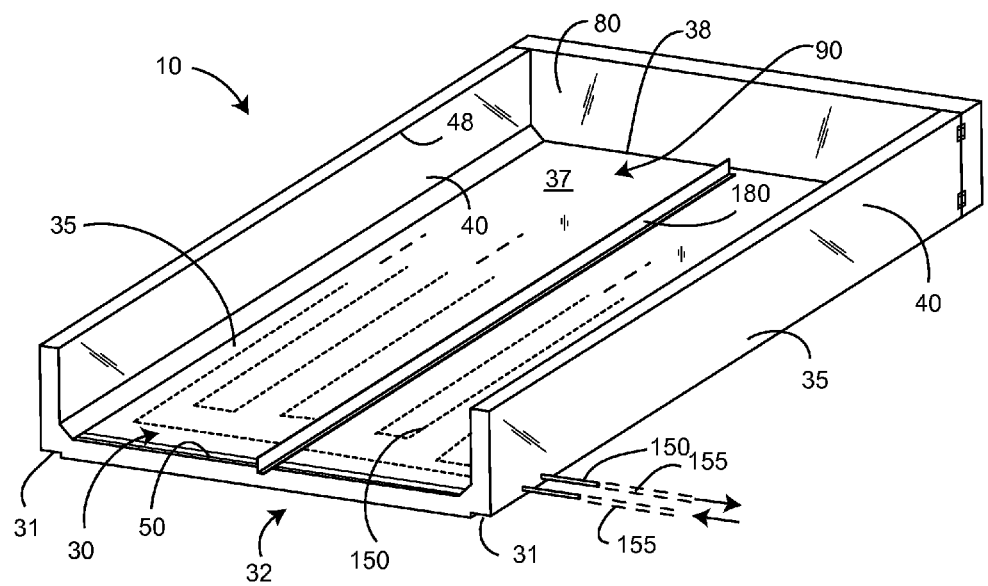
FIG. 1 is a perspective view of the invention, illustrating a slab and a divider.
Figure 2:
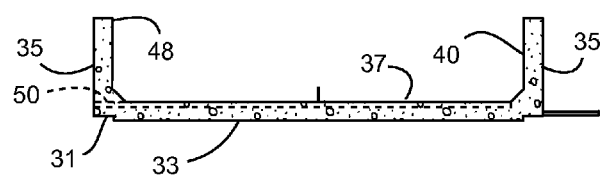
FIG. 2 is a front elevational view of the invention.
Figure 7:
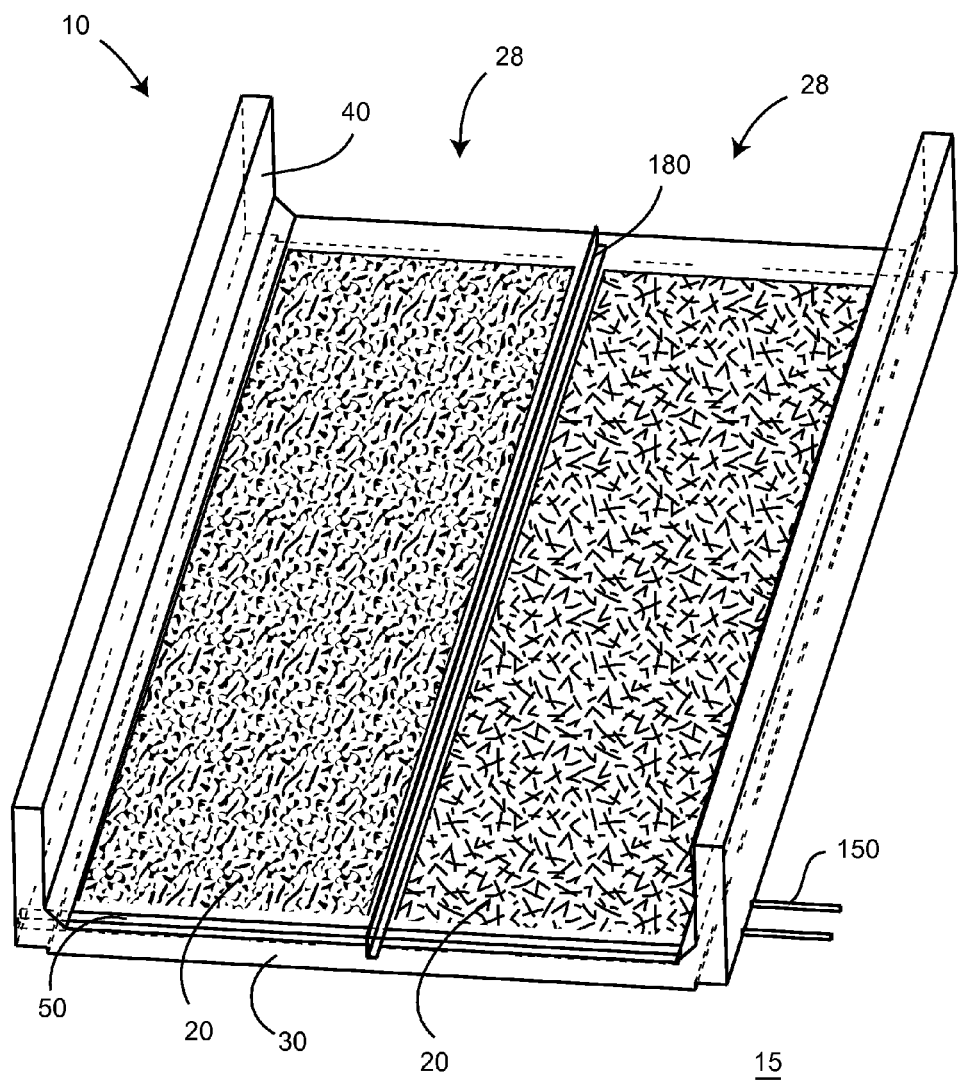
FIG. 7 is a perspective view of the invention, illustrating a divider and seeds on a slab.

With respect to the drawings, FIG. 7 illustrates a structure 10 for growing plants 20, such as fodder, on a ground surface 15. In FIGS. 1 and 2, the structure 10 includes an elongated concrete slab 30 having a pair of sides 35, a front side 32, a back side 38, a bottom surface 33, and a top surface 37. In FIG. 1, each side 35 has a raised curb 40 having an upper edge 48. Preferably, the slab 30 is approximately 2.4 meters wide by three meters long. Preferably in one embodiment, the curbs 40 are raised between 20 cm to 40 cm above the top surface of the slab 30.

Figure 4:
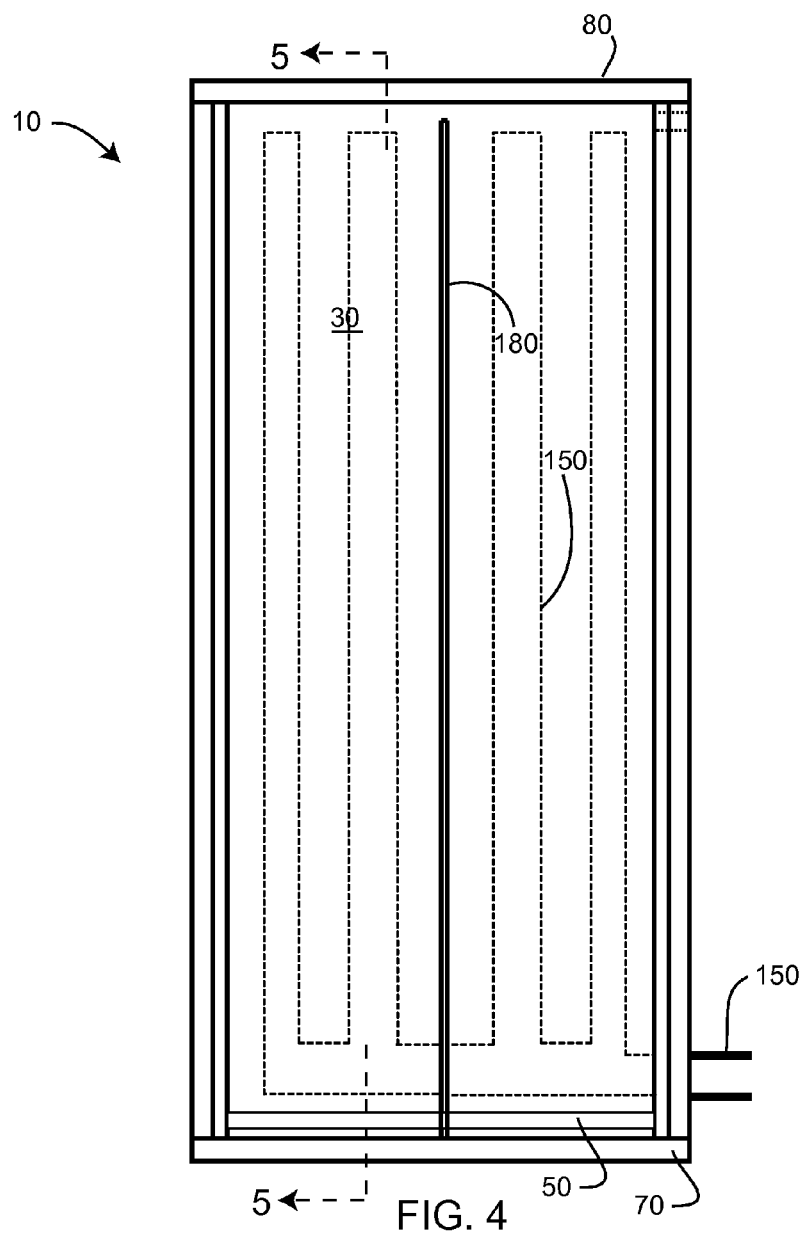
FIG. 4 is a top plan view of the invention, illustrating at least one pipe.
Figure 6:
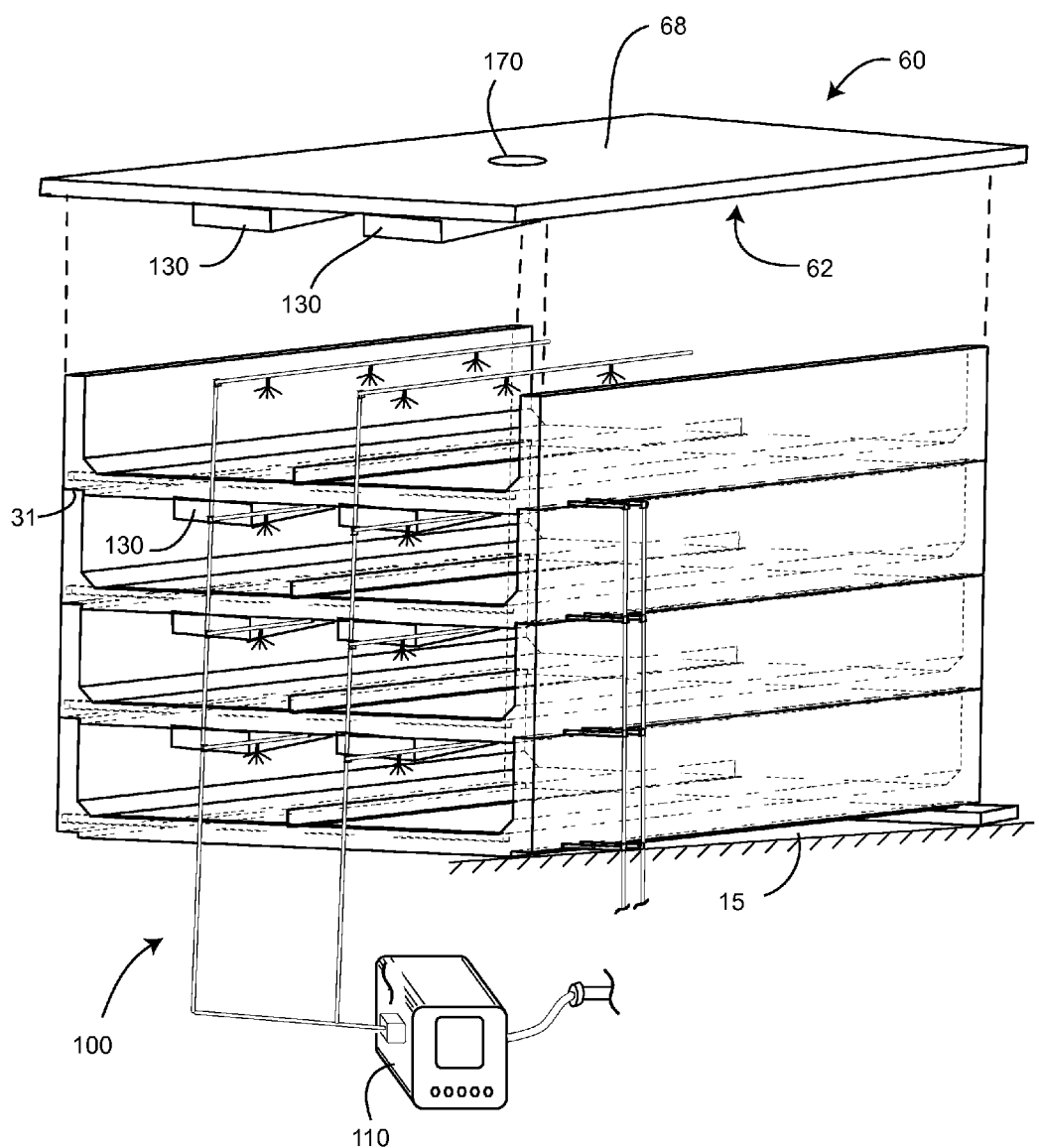
FIG. 6 is a perspective view of the invention, illustrating a plurality of stacked slabs and a roof.

In FIG. 6, a roof 60 is fixed with the upper edge of each curb 40 and including a bottom surface 62 and a top surface 68. In FIGS. 1 and 4, a front end panel 70 and a rear end panel 80 are each selectively fixed between the roof 60, the curbs 40 and the slab 30. In FIG. 1, an interior space 90 is defined within the structure 10 between the slab 30, roof 60, end panels 70,80 and curbs 40. In one embodiment in FIG. 1, the end panels 70,80 are attached to each slab 30 using a hinge 160, facilitating access to the interior space 90. In another embodiment, the roof 60 is pivotally fixed with the top edge 48 of the curb 40 of one of the sides 35, facilitating the removal of the roof 60 as desired.

In FIG. 6, an irrigation system 100 extends along the length of the slab 30 and includes a controller 110. The irrigation system 100 is adapted to irrigate the top surface 37 of the slab 30 based on a timed schedule of the controller 110. A plurality of lamps 130 extend along the length of the slab 30 and are fixed with the bottom surface 62 of the roof 60, as illustrated in FIG. 6. In one embodiment, each lamp 130 is a fluorescent lamp.

In FIGS. 1 and 4, at least one heating pipe 150 is within each slab 30 such that a heat exchange fluid 155 may be circulated through each heating pipe 150 to heat the slab 30 and the plants 20 within the structure 10. Preferably, the heat exchange fluid 155 is water, which may be heated by an outside source (not shown). Preferably, the concrete temperature of each slab 30 is maintained between 18 to 25 degrees Celsius. If the concrete exceeds 25 degree Celsius the fodder becomes anaerobic and mold and bacteria will flourish. If lower than 18 degrees Celsius, the fodder is very slow to grow.

Figure 5:
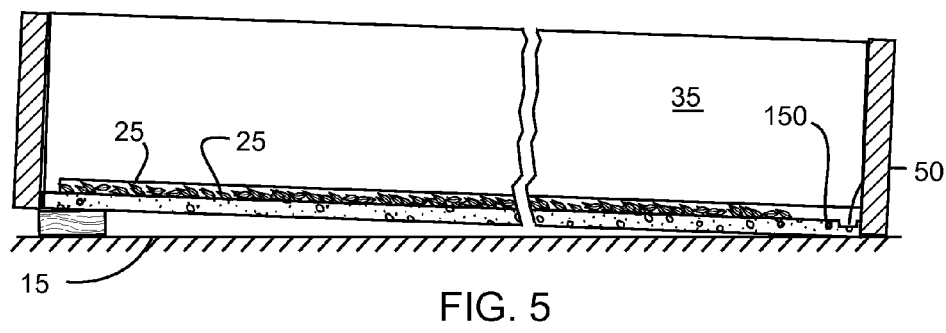
FIG. 5 is a side elevational view, taken generally along lines 5-5 of FIG. 4.

In FIG. 5, plant seeds 25 may be scattered on the top surface 37 of the slab 30. The seeding rate depends on the particular type of seed to be used. In one embodiment, the seeding rate is 6.5 kg per square meter. In another embodiment, a seeder box (not shown) is elevated up for the seeding of the slab 30. The roof 60 is then affixed to the upper edges of the curbs 40 and the end panels 70,80 are fixed with the roof 60, curbs 40 and slab 30. The seeds 25 are irrigated based on the timed schedule by the irrigation system 100 and illuminated by the plurality of lamps 130 to grow the plants 20. The end panels 70,80 are removed for harvesting the plants 20 once the plants 20 have grown. In one embodiment, the structure 10 will be able to produce fresh fodder every 6 days.

Figure 3:
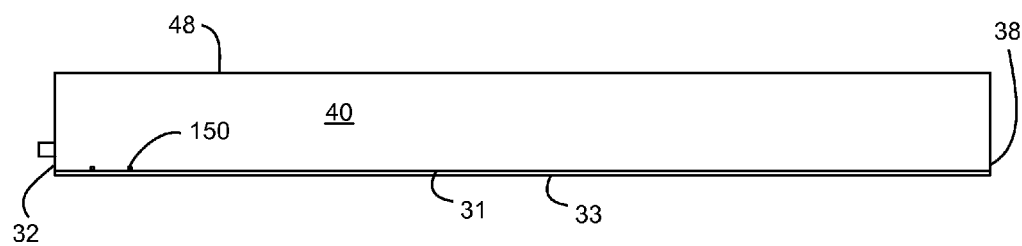
FIG. 3 is side elevational view of the invention.

In one embodiment illustrated in FIGS. 2 and 3, the bottom surface of each slab 30 includes recessed portions 31 proximate each side 35 thereof for receiving the upper edge 48 of the raised curbs 40 of another slab 30. A plurality of the slabs 30 may then be vertically stacked with the roof 60 fixed to a top slab 31, as illustrated in FIG. 6. Also in FIG. 6, the irrigation system 100 and lamps 130 extend along the length of each slab 30, illuminating and irrigating the top surface 37 of each slab 30.

In one embodiment in FIG. 7, a drainage gutter 50 is included in the top surface 37 of the slab 30 proximate the front side 32 thereof. The back side 38 of the slab 30 may be raised with respect to a level ground surface 15 such that water drains towards the front side 32 of the slab 30. In one embodiment, the structure 10 is angled so that the slab 30 has an approximate 7-degree fall in the direction of the gutter 50.

In one embodiment illustrated in FIG. 6, the roof 60 further includes at least one fan 170 for ventilating the interior space 90 of the structure 10. In another embodiment (not shown), the panels 70,80 each include at least one fan 170 for ventilating the interior space 90 of the structure 10. In one more embodiment (not shown), the panels 70,80 each include at least one fan 170 between each slab 30 for ventilating the interior space between each slab 30.

In one embodiment in FIG. 1, at least one selectively removable divider 180 is included from the back side 38 to the front side 32 on the top surface 37 of the slab 30. Harvesting of the plants 20 is facilitated by using the divider 180 to divide the plants 20 on the slab 30 into at least two separately harvestable sections of plants 28, as illustrated in FIG. 7. Each divider 180 may be made from a durable and hard material such as a hard metal, but other suitable materials may be used such as a hard plastic.

In use, a method of growing plants 20 on a ground surface 15 includes the following steps. First, an elongated concrete slab 30 is provided having a pair of sides 35, a front side 32, a back side 38, a bottom surface 33, and a top surface 37. Each side has a raised curb 40 having an upper edge 48. A roof 60 is fixed with the upper edge 48 of each curb 40. The roof 60 includes a bottom surface 62 and a top surface 68. A front end panel 70 and a rear end panel 80 are each selectively fixed between the roof 60, the curbs 40 and the slab 30. An interior space 90 is defined within the structure 10 between the slab 30, roof 60, panels 70,80 and curbs 40. An irrigation system 110 extends along the length of the slab 30 and includes a controller 110. The irrigation system 100 is adapted to irrigate the top surface 37 of the slab 30 based on a timed schedule of the controller 110. At least one heating pipe 150 is within each slab 30 such that a heat exchange fluid 155 may be circulated through each heating pipe 150 to heat the slab 30 and the plants 20 within the structure 10. A plurality of lamps 130 extend along the length of the slab 30 and are fixed with the bottom surface 62 of the roof 60.

Second, plant seeds 25 are scattered on the top surface 37 of the slab 30. Third, the panels 70,80 are affixed with the roof 60, curbs 40 and slab 30. Fourth, the seeds 25 are irrigated based on the timed schedule by the irrigation system 100 and illuminated by the plurality of lamps 130 to grow the plants 20. And finally, the panels 70,80 are removed for harvesting the plants 20 once the plants 20 have grown.

In another embodiment of the method, a plurality of elongated concrete slabs 30 are provided, with each slab 30 having a pair of sides 35, a front side 32, a back side 38, a bottom surface 33, and a top surface 37. Each side 35 has a raised curb 40 having an upper edge 48. The bottom surface 33 of each slab 30 including recessed portions 31 proximate each side 35 thereof for receiving the upper edge 48 of the raised curbs 40 of one of the other slabs 30. Each slab 30 is vertically stacked with the other slabs 30. A roof 60 is fixed with the upper edge 48 of each curb 40 of a top slab 31. The roof includes a bottom surface 62 and a top surface 68. A front end panel 70 and a rear end panel 80 are each selectively fixed between the roof 60, the curbs 40 and the slabs 30. An interior space 90 is defined within the structure 10 between the slabs 30, roof 60, panels 70,80, and curbs 40. An irrigation system 100 extends along the length of each slab 30 and includes a controller 110. The irrigation system 100 is adapted to irrigate the top surface 37 of each slab 30 based on a timed schedule of the controller 110. At least one heating pipe 150 is located within each slab 30 such that a heat exchange fluid 155 may be circulated through each heating pipe 150 to heat the slabs 30 and the plants 20 within the structure 10. A plurality of lamps 130 extend along the length of each slab 30 and are fixed with the bottom surface 33 of each above slab 30 and the bottom surface 62 of the roof 60. In this embodiment, the plant seeds 25 are scattered on the top surface of each slab 30.

While a particular form of the invention has been illustrated and described, it will be apparent that various modifications can be made without departing from the spirit and scope of the invention. For example, additional removable dividers 180 may be used to create additional harvestable sections of plants 28. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A structure for growing plants on a ground surface, comprising:
    at least one elongated concrete slab having a pair of sides, a front side, a back side, a bottom surface, and a top surface, each side having a raised curb having an upper edge;
    a roof fixed with the upper edge of each curb and including a bottom surface and a top surface;
    a front end panel and a rear end panel each selectively fixed between the roof, the curbs and the slab, an interior space being defined within the structure between the slab, roof, end panels, and curbs;
    an irrigation system extending along the length of the slab and including a controller, the irrigation system adapted to irrigate the top surface of the slab based on a timed schedule of the controller;
    at least one heating pipe within each slab such that a heat exchange fluid may be circulated through each heating pipe to heat the slab and the plants within the structure; and
    a plurality of lamps extending along the length of the slab and fixed with the bottom surface of the roof;
    whereby plant seeds may be scattered on the top surface of the slab, the roof being affixed to the upper edges of the curbs, the end panels being fixed with the roof, curbs and slab, the seeds being irrigated based on the timed schedule by the irrigation system and illuminated by the plurality of lamps to grow the plants, the end panels being removed for harvesting the plants once the plants have grown.

2. The structure of claim 1 wherein the bottom surface of each slab includes recessed portions proximate each side thereof for receiving the upper edge of the raised curbs of another slab, whereby a plurality of the slabs may be vertically stacked with the roof fixed to a top slab, the irrigation system and lamps extending along the length of each slab, whereby the top surface of each slab may be illuminated and irrigated.

3. The structure of claim 2 wherein the end panels each include at least one fan between each slab for ventilating the interior space between each slab.

4. The structure of claim 1 wherein a drainage gutter is included in the top surface of the slab proximate the front side thereof, whereby the back side of the slab may be raised with respect to a level ground surface such that water drains towards the front side of the slab.

5. The structure of claim 1 wherein each lamp is a fluorescent lamp.

6. The structure of claim 1 wherein the roof further includes at least one fan for ventilating the interior space of the structure.

7. The structure of claim 1 wherein the end panels each include at least one fan for ventilating the interior space of the structure.

8. The structure of claim 1 wherein the curbs are raised between 20 cm to 40 cm above the top surface of the slab.

9. The structure of claim 1 wherein at least one selectively removable divider is included from the back side to the front side on the top surface of the slab, whereby harvesting of the plants is facilitated by dividing the plants on the slab into at least two separately harvestable sections of plants.

10. A method growing plants on a ground surface, comprising the steps:
   a) providing at least one elongated concrete slab having a pair of sides, a front side, a back side, a bottom surface, and a top surface, each side having a raised curb having an upper edge; a roof fixed with the upper edge of each curb and including a bottom surface and a top surface; a front end panel and a rear end panel each selectively fixed between the roof, the curbs and the slab, an interior space being defined within the structure between the slab, roof, end panels, and curbs; an irrigation system extending along the length of the slab and including a controller, the irrigation system adapted to irrigate the top surface of the slab based on a timed schedule of the controller; at least one heating pipe within each slab such that a heat exchange fluid may be circulated through each heating pipe to heat the slab and the plants within the structure; and a plurality of lamps extending along the length of the slab and fixed with the bottom surface of the roof;
   b) scattering plant seeds on the top surface of the slab;
   c) affixing the end panels with the roof, curbs and slab;
   d) irrigating the seeds based on the timed schedule by the irrigation system and illuminating the plurality of lamps to grow the plants; and
   e) removing the end panels for harvesting the plants once the plants have grown.

11. The method of claim 10 wherein step a) is:
   a) providing a plurality of elongated concrete slabs each having a pair of sides, a front side, a back side, a bottom surface, and a top surface, each side having a raised curb having an upper edge, the bottom surface of each slab including recessed portions proximate each side thereof for receiving the upper edge of the raised curbs of one of the other slabs, each slab vertically stacked with the other slabs; a roof fixed with the upper edge of each curb of a top slab and including a bottom surface and a top surface; a front end panel and a rear end panel each selectively fixed between the roof, the curbs and the slabs, an interior space being defined within the structure between the slabs, roof, end panels, and curbs; an irrigation system extending along the length of each slab and including a controller, the irrigation system adapted to irrigate the top surface of each slab based on a timed schedule of the controller; at least one heating pipe within each slab such that a heat exchange fluid may be circulated through each heating pipe to heat the slabs and the plants within the structure; and a plurality of lamps extending along the length of each slab and fixed with the bottom surface of each slab above and the roof;
   and wherein step b) is b) scattering plant seeds on the top surface of each slab.

\* \* \* \* \*